March 14, 1950 M. L. M. SOUGET 2,500,264

HAND-SET SUPPORT AND INDUCTIVE PICK-UP FOR TELEPHONE SIGNAL AMPLIFYING SYSTEM

Filed Dec. 4, 1946 2 Sheets-Sheet 1

ML.M. Souget
Inventor

By Ross C. Harvey

Attorney

March 14, 1950 M. L. M. SOUGET 2,500,264

HAND-SET SUPPORT AND INDUCTIVE PICK-UP FOR TELEPHONE SIGNAL AMPLIFYING SYSTEM

Filed Dec. 4, 1946 2 Sheets-Sheet 2

M.L.M. Souget
Inventor

By Ross ???
Attorney

Patented Mar. 14, 1950

2,500,264

UNITED STATES PATENT OFFICE 2,500,264

HANDSET SUPPORT AND INDUCTIVE PICK-UP FOR TELEPHONE SIGNAL AMPLIFYING SYSTEM

Matthys L. M. Souget, New York, N. Y.

Application December 4, 1946, Serial No. 713,951

5 Claims. (Cl. 179—1)

Figure 1:
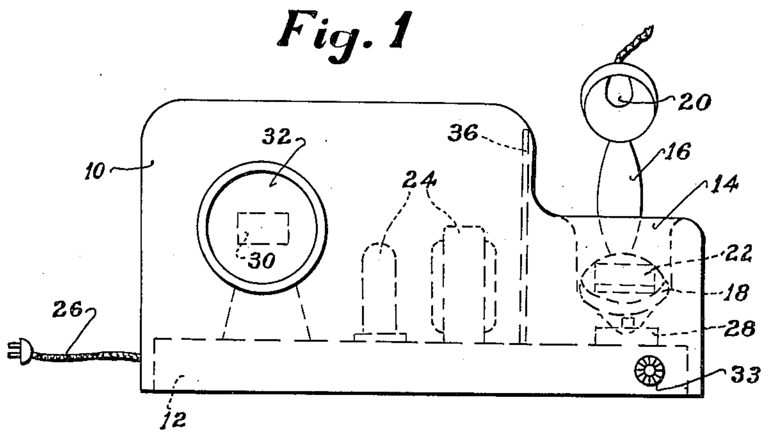

This invention relates to telephone apparatus, and has for its principal object to provide a device for use in connection with a standard type of subscriber's instrument which will enable the user to hear incoming conversation without necessitating his holding the handset of the telephone in position at his ear.

It is a matter of common knowledge that it is often desirable for a telephone user to maintain a connection for extended periods during which it is unnecessary for him to speak into the transmitter of his instrument. This happens particularly in business use of telephones, for example while awaiting the completion of a long distance circuit, awaiting connection with a temporarily "busy" branch line of a distant private exchange, or waiting while a called party looks up information or the like. During such periods, it has heretofore been necessary for the user to maintain his instrument in position at his ear in order to be aware when the conversation can be resumed or terminated. This has greatly restricted the freedom of movement of the telephone user, besides preventing him from diverting his attention to other matters during idle periods, a situation which is a source of much inconvenience and often actual economic loss.

I am aware that it has been proposed to provide a system for amplifying the incoming sound from a telephone by means of a microphone at the receiver feeding a loud speaker through an amplifier, together with a sensitive pick-up microphone, amplifier and reproducer (the latter located at the telephone transmitter) in order to enable the telephone user to hear and talk over a telephone from a relatively remote distance, but such arrangements are unduly complicated, expensive, and involve an undesirable loss of privacy in the use of the telephone.

It is hence an additional object of the invention to provide a simple and inexpensive accessory for use with an ordinary telephone which will amplify sounds being received through the telephone receiver so as to be audible over a relatively wide area, such as a room or office, whereby the user will be able to carry on other activities during idle periods of the conversation, yet have his attention redirected to the telephone instrument when required. A further object is to provide such a device which will not require modification or electrical connection to the telephone instrument, and whose use will therefore be unobjectionable to the owner or lessor of the telephone equipment. A still further object is to provide such an apparatus which will be energized in an automatic manner by a natural movement in placing the telephone instrument in acoustic relation thereto, whereby amplifying power will be consumed only when the device is in actual use, without the necessity for a separate switching operation.

Another object of the invention is to provide a device of the character described with which it will be possible to speak into the transmitter element of the telephone from a comfortable distance without the aid or interposition of any additional mechanical or electrical equipment.

Additional objects of the invention are to provide a device of the class described which is extremely simple and economical to manufacture and use, and whose operating cost will be so low as to be negligible.

Figure 2:
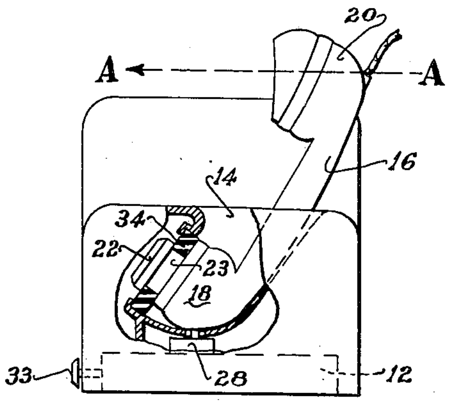
Figure 3:
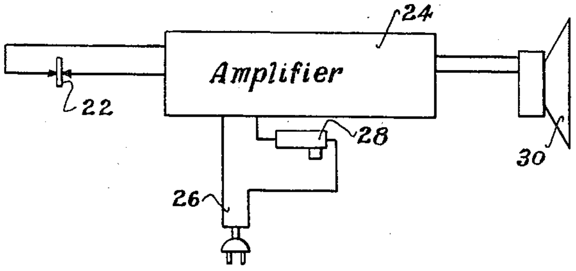
Figure 4:
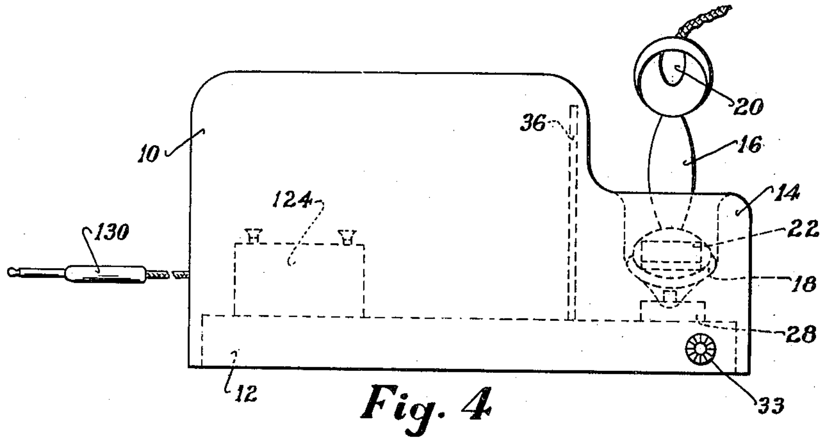
Figure 5:
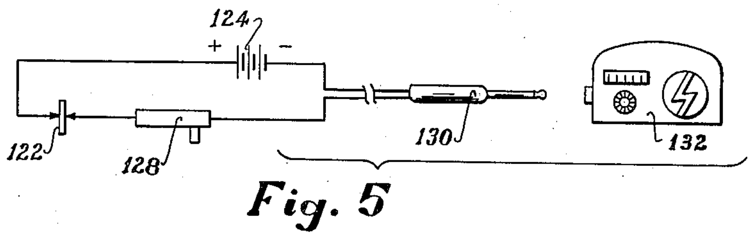
Figure 6:
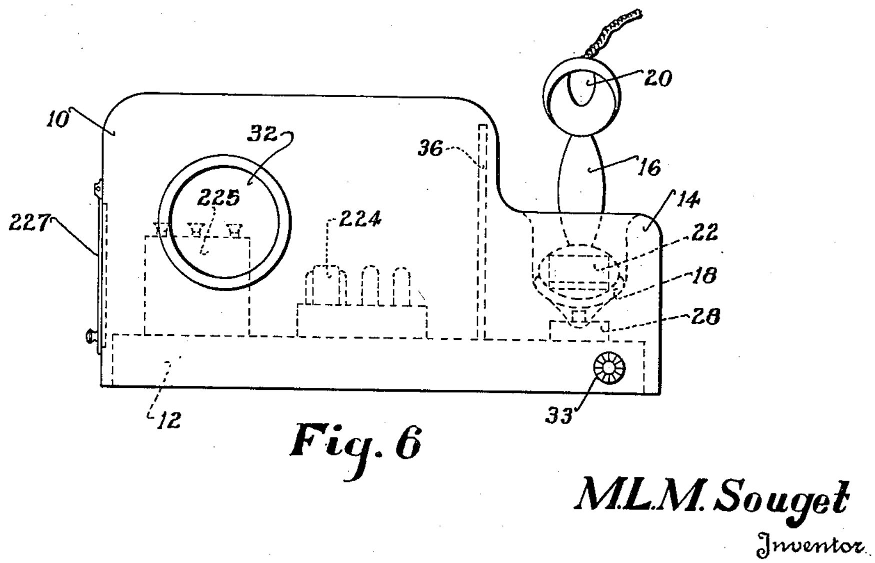

With the above objects in mind, the invention will best be understood by reference to the following detailed description of a preferred embodiment of the device, taken in connection with the accompanying drawings, in which Fig. 1 is a front elevation of one form of the invention, showing a standard telephone handset in operative relation thereto, Fig. 2 is a side view of the same, Fig. 3 is a diagrammatic view of the electrical connections, Fig. 4 is a view similar to Fig. 1 of a slightly modified form of the invention, Fig. 5 is a diagrammatic view of the electrical connections pertinent to the modified form of Fig. 4, and Fig. 6 is a view similar to Fig. 1 but of a still further modification of the invention.

Referring now to Fig. 1 of the drawings, there is shown a cabinet structure 10 containing a chassis 12 and which cabinet has a portion which may be of reduced height and contains a recess 14 opening into its top surface. Recess 14 is contoured to receive that end of a standard telephone handset 16 which includes the receiver element 18, transmitter element 20 being disposed at the opposite end of handset 16 in the usual way. Mounted within the cabinet and in such a position as to cooperate, via an opening 23, with the receiver element 18 is a microphone 22. This microphone is preferably of the carbon type, although any equivalent microphone may be used.

Housed within cabinet 10 is a suitable amplifier such as a vacuum tube amplifier 24 provided with a power cord 26 extending outside the cabinet for connection to a usual and convenient electrical outlet. The power circuit of amplifier 24 is controlled by a switch 28 of the momentary type, so located within cabinet 10, but having its operating element projecting into the recess 14, as to be put in "closed" position whenever a handset is inserted in recess 14, and to be opened upon removal of the handset.

Located within cabinet 10 is a loudspeaker 30 connected to the output side of amplified 24 and capable of radiating amplified sound outside the cabinet, as through a grill 32 of usual form placed at one end of the cabinet. A knob 33 or the like provides control for the loudspeaker volume in the usual way.

A rubber grommet 34 or member of similar resilient material may surround the opening 23 in order to provide a tight and efficient acoustic coupling between handset receiver 18 and the microphone 22, as well as to ensure good contact regardless of carelessness in inserting the handset in recess 14. If desired, a baffle plate 36 or equivalent means may be provided within cabinet 10 in a position to prevent direct acoustic coupling between the rear side of speaker 30 and the microphone 22, and hence to eliminate the possibility of objectionable regenerative oscillations.

The operation of the invention will be clear from the above description. Whenever the telephone user finds himself in a position of idle waiting, all that is necessary is to insert his handset in recess 14, receiver-element 18 downward, which will, by the action of switch 28, energize the amplifier 24. Incoming speech, if any occurs, will be picked up by microphone 22, amplified and directed into the surrounding area, at a desired level; the user is thus enabled to maintain supervision of the instrument without requiring him to occupy his hands with the telephone handset, and has a considerable freedom of movement without danger of missing a pertinent portion of the incoming speech. When it is necessary for him to speak into the transmitter, he may remove the handset from the cabinet 10 and proceed to use it in the ordinary manner. Alternatively, he may, of course, speak into the transmitter of the handset without removing the latter from the cabinet, particularly if an extended speech is not required. As a matter of fact, while there is no provision for amplifying speech input to the transmitter 20, I have found that the apparent sensitivity of the transmitter is noticeably increased by the use of a device of the kind described, so that the user may speak to transmitter 20 from a substantial distance and still maintail reasonable transmitter output to the telephone line. I believe this is to be due to the fact that in nearly any telephone handset there is a certain amount of feed-back of transmitter energy to the receiver element, technically called "side-tone." Hence local speech energy into transmitter 20 is to some extent fed into receiver unit 18 (as well as to the outgoing line), and then amplified just as incoming speech would be, reproduced by speaker 32 and thus ultimately delivered to transmitter 20 via the intervening air path, effecting a reenforcement of the speech picked up at low level directly by the transmitter. This roundabout regeneration occurs at a level below that at which howling would be produced, and appears to be effective to increase the range at which one may successfully talk into transmitter 20 when the handset is in place in cabinet 10. It will be observed that the radiating surface of speaker 30 is roughly parallel to the plane of telephone transmitter 20, a condition which I have found to produce the above regeneration without, however, any objectionable howling.

Whatever the reason may be, the increased sensitivity is definitely noticeable and contributes to the utility of my device. I do not, of course, wish to be restricted by the theoretical explanation above of the reasons for this effect.

In the modification shown in Figs. 4 and 5, advantage is taken of the wide distribution of radio receivers, electric phonographs and the like, to simplify the construction of the telephone auxiliary of my invention by eliminating the amplifier and loudspeaker of the latter and providing for coupling of the device to the audio system of such a reproducer. In this modification, cabinet 100 with its recess 114 contains a microphone unit 122 as before, and additionally contains a dry battery 124 (if a carbon type microphone 122 is employed). As best indicated in Fig. 5, the battery and microphone are connected in series with a switch 128 located and functioning like switch 28 of the previous embodiment. The output cord of this circuit terminates in a plug 130 or equivalent connector element adapted to be coupled into the audio system of a radio receiver, phonograph or the like indicated in dashed lines at 132. With this arrangement, it is unnecessary to provide a separate power cord for the auxiliary of the invention, since a battery of sufficient capacity for a very long term of service may easily and cheaply be installed within the cabinet 100.

Fig. 6 illustrates diagrammatically a third modification in which the power-operated amplifier of the first form of the invention is replaced by an amplifier of a type efficiently operable from small dry cell batteries contained within the cabinet 200. In this form, the amplifier is designated by numeral 224, and the dry battery pack by numeral 225. Switch 228 need control only the filamentary circuits of the amplifier, and a small door 227 is provided for ready replacement of the dry batteries or multi-unit dry battery pack, which may be of a type commonly employed for powering small portable radio receivers. It will be observed that since power is drawn from batteries 225 only when the device is in actual use, the life of such batteries can be quite long, so that the cost of operation of the device can be kept low. Obviously, this modification of the invention has the advantage that no power cord or other electrical connection of any kind is required, the unit being completely self-contained, conducive to neatness of the installation and reduction of installation expense.

The cabinet arrangement of all of the above forms of the invention, as best seen in Fig. 2, and the internal shape of the recess 14, provide for optimum positioning of the handset 16, so that its transmitter portion 20 faces the front of the cabinet, and hence is adapted to receive speech from the user occupying a normal position in front of the cabinet. This arrangement, coupled with the regenerative amplification mentioned above, provides a degree of freedom for the user, both in listening and talking, which cannot be obtained if the transmitter were to be so positioned as to obscure the direct transmission of voice waves thereto, and makes it unnecessary and undesirable to provide a separate amplification channel for feeding such transmitter. The transmitter element of an ordinary handset of the kind shown in the drawings is designed to have an axis of maximum sensitivity approximately in the direction of the line A—A in Figure 2, and the design of my cabinet 10 and its recess 14 are such that this axis is maintained approximately horizontal, whereby the user's voice is picked up, even from a distance, particularly where the cabinet is set up on a desk or table facing the user's normal seated position. It will be understood, however, that it is also quite feasible to direct speech into the transmitter element from other positions. This arrangement of the handset support forms an important feature of my invention.

It will be observed from the above description that I have satisfied all of the objects of my invention by a device which is unitary and substantially self-contained, which can be manufactured and used at low cost, and which is trouble-free and convenient in operation. It is to be understood that many changes and modifications can be made in the invention without departing from the spirit thereof as defined in the appended claims.

I claim:

1. In a device of the character described for use with a telephone handset of the type having spaced receiver and transmitter portions, the combination of a cabinet, a recess within said cabinet adapted to receive the receiver portion of a handset and to support the said handset with its transmitter portion extending outside said cabinet and so as to have the axis of maximum sensitivity of said transmitter portion approximately horizontal, sound pick-up means within said cabinet disposed adjacent a wall of said recess for acoustical connection with the receiver portion of a handset placed therein, and means for amplifying the sound picked up by said pick-up means.

2. In a device of the character described for use with a telephone handset of the type having spaced receiver and transmitter portions, the combination of a cabinet, a recess within said cabinet adapted to receive the receiver portion of a handset and to support the said handset with its transmitter portion extending outside said cabinet and so as to have the axis of maximum sensitivity of said transmitted portion approximately horizontal, energy pick-up means within said cabinet disposed adjacent a wall of said recess for energy transfer relationship with the receiver portion of a handset placed therein, and means for amplifying the energy picked up by said pick-up means.

3. In apparatus for amplifying signals produced by the receiver of a telephone handset of the type comprising spaced receiver and transmitter portions arranged to face in generally the same direction, a cabinet, a recessed pocket in one face of said cabinet dimensioned to receive and encompass the receiver end only by such a handset, one wall of said pocket being cupped to support the body of such a handset with its transmitter portion extending outside said pocket and cabinet, a second wall of said pocket lying in spaced relation to said first wall to act as an abutment for the receiver portion of the handset, energy pickup means located within the latter wall for energization by signals reproduced by the receiver portion of the handset, and an energy amplifier and loudspeaker in said cabinet connected for energization by said pick-up means.

4. In apparatus for amplifying signals produced by the receiver of a telephone handset of the type comprising spaced receiver and transmitter portions arranged to face in generally the same direction, a cabinet, a recessed pocket in one face of said cabinet dimensioned to receive and encompass the receiver end only of such a handset, one wall of said pocket being cupped to support the body of such a handset with its transmitter portion extending outside said pocket and cabinet, a second wall of said pocket lying in spaced relation to said first wall to act as an abutment for the receiver portion of the handset, energy pick-up means located within the latter wall for energization by signals reproduced by the receiver portion of the handset, an emergency amplifier and loudspeaker in said cabinet connected for energization by said pick-up means, and a power switch located on the first wall of said pocket for operation upon insertion of a handset in said pocket, said power switch being connected to control said amplifier.

5. In apparatus for amplifying signals produced by the receiver of a telephone handset of the type comprising spaced receiver and transmitter portions arranged to face in generally the same direction, a cabinet, a recessed pocket in one face of said cabinet dimensioned to receive and encompass the receiver end only of such a handset, one wall of said pocket being cupped to support the body of such a handset with its transmitter portion extending outside said pocket and cabinet, a second wall of said pocket lying in spaced relation to said first wall to act as an abutment for the receiver portion of the handset, energy pick-up means located within the latter wall for energization by signals reproduced by the receiver portion of the handset, and an energy amplifier and loudspeaker in said cabinet connected for energization by said pick-up means, said loud-speaker being mounted in a wall of said cabinet with its sound reproducing axis directed in the same direction as the axis of maximum sensitivity of the transmitter portion of a handset resting in said pocket.

MATTHYS L. M. SOUGET.

REFERENCES CITED

The following references are of record in the file of this patent:

UNITED STATES PATENTS

| Number | Name | Date |
|---|---|---|
| 1,630,536 | Maurer | May 31, 1927 |
| 1,697,007 | Hood | Jan. 1, 1929 |
| 2,071,053 | Varley | Feb. 16, 1937 |
| 2,082,130 | Varley | June 1, 1937 |
| 2,160,829 | Cherry | June 6, 1939 |
| 2,214,992 | Chevassus | Sept. 17, 1940 |
| 2,354,470 | Toplsen | July 25, 1944 |
| 2,402,341 | Patterson | June 18, 1946 |

FOREIGN PATENTS

| Number | Country | Date |
|---|---|---|
| 285,084 | Italy | Apr. 30, 1931 |